(12) United States Patent
Xi et al.

(10) Patent No.: US 12,436,436 B2
(45) Date of Patent: Oct. 7, 2025

(54) DISPLAY SUBSTRATE AND MANUFACTURING METHOD THEREFOR, AND DISPLAY DEVICE

(71) Applicants: Fuzhou BOE Optoelectronics Technology Co., Ltd., Fujian (CN); BOE Technology Group Co., Ltd., Beijing (CN)

(72) Inventors: Wenxing Xi, Beijing (CN); Weiwang Wang, Beijing (CN); Zhenyou Zou, Beijing (CN); Xue Yu, Beijing (CN); Zhouyu Chen, Beijing (CN); Chengjun Liu, Beijing (CN); Chenglong Wu, Beijing (CN); Bin Lin, Beijing (CN)

(73) Assignees: Fuzhou BOE Optoelectronics Technology Co., Ltd., Fujian (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/023,689

(22) PCT Filed: Mar. 23, 2022

(86) PCT No.: PCT/CN2022/082562
§ 371 (c)(1),
(2) Date: Feb. 27, 2023

(87) PCT Pub. No.: WO2023/178560
PCT Pub. Date: Sep. 28, 2023

(65) Prior Publication Data
US 2024/0427206 A1    Dec. 26, 2024

(51) Int. Cl.
*G02F 1/1362* (2006.01)
*G02F 1/1368* (2006.01)

(52) U.S. Cl.
CPC ...... *G02F 1/136295* (2021.01); *G02F 1/1368* (2013.01)

(58) Field of Classification Search
CPC ............. G02F 1/136295; G02F 1/1368; G02F 1/1362; H10D 86/00
See application file for complete search history.

(56) References Cited

U.S. PATENT DOCUMENTS

2016/0240601 A1   8/2016  Kwon et al.
2017/0317153 A1   11/2017 Shin
(Continued)

FOREIGN PATENT DOCUMENTS

CN    105182646 A    12/2015
CN    106444189 A    2/2017
(Continued)

*Primary Examiner* — Mariam Qureshi
(74) *Attorney, Agent, or Firm* — IPro, PLLC

(57) ABSTRACT

Provided are a display substrate and a manufacturing method therefor, and a display device. The display substrate includes: a base substrate including a display area and a frame area located on at least one side of the display area; a plurality of shift registers arranged in cascade in the frame area; a plurality of jumper terminals located between the shift registers and the display area and including first jumper terminals and second jumper terminals; a plurality of transfer terminals located between the shift registers and the display area, and located on a side of the layer where the first jumper terminals are located away from the base substrate; and an insulating layer located in the display area and the frame area, located between a layer where the second jumper terminals are located and a layer where the plurality of transfer terminals are located, and including a channel.

17 Claims, 9 Drawing Sheets

(56) References Cited

U.S. PATENT DOCUMENTS

| | | |
|---|---|---|
| 2018/0108314 A1 | 4/2018 | Cao et al. |
| 2020/0388637 A1* | 12/2020 | Kikuchi .............. G02F 1/13685 |
| 2022/0108666 A1* | 4/2022 | Watanabe ............. G02F 1/1368 |

FOREIGN PATENT DOCUMENTS

| | | |
|---|---|---|
| CN | 107342293 A | 11/2017 |
| CN | 111123591 A | 5/2020 |
| CN | 210924151 U | 7/2020 |
| CN | 112054031 A | 12/2020 |
| CN | 113437086 A | 9/2021 |

* cited by examiner

DISPLAY SUBSTRATE AND MANUFACTURING METHOD THEREFOR, AND DISPLAY DEVICE

CROSS REFERENCE TO RELATED APPLICATIONS

The present disclosure is a US National Stage of International Application No. PCT/CN2022/082562, filed on Mar. 23, 2022, the entire contents of which are incorporated herein by reference.

FIELD OF INVENTION

The disclosure relates to the field of display technology, and in particular, to a display substrate and a manufacturing method therefor, and a display device.

BACKGROUND

At present, the market demand for high-end flat & curved displays with high resolution, high aperture ratio and low power consumption is increasing. Here, the curved displays with high business, education and extensive entertainment application scenarios need to be obtained through the organic film technology. Due to many advantages such as high flatness and low power consumption, the organic film process is also increasingly applied by major panel manufacturers in the research and development application of the high-end notebook/touch screen (NB/TPC).

SUMMARY

The disclosure provides a display substrate and a manufacturing method therefor, and a display device. The specific solutions are as follows.

In one aspect, an embodiment of the disclosure provides a display substrate, including:
a base substrate including a display area and a frame area located on at least one side of the display area;
a plurality of shift registers located in the frame area and arranged in cascade;
a plurality of jumper terminals located between the shift registers and the display area and including first jumper terminals and second jumper terminals, where the first jumper terminals are electrically connected to the shift registers, and the second jumper terminals are located between a layer where the first jumper terminals are located and the base substrate;
a plurality of transfer terminals located between the shift registers and the display area, and located on a side of the layer where the first jumper terminals are located away from the base substrate; and
an insulating layer located in the display area and the frame area, located between a layer where the second jumper terminals are located and a layer where the plurality of transfer terminals are located, and including a channel exposing the plurality of jumper terminals; where a first jumper terminal and a second jumper terminal of a same jumper terminal are directly overlapped with a same transfer terminal respectively in the channel.

In some embodiments, the above display substrate provided in the embodiments of the disclosure further includes: a first conductive layer located on a side of the insulating layer away from the base substrate, where the plurality of transfer terminals are located in the first conductive layer.

In some embodiments, in the above display substrate provided in the embodiments of the disclosure, the insulating layer includes a gate insulating layer, a first inorganic insulating layer and an organic insulating layer arranged in sequence on a side of the layer where the second jumper terminals are located facing the first conductive layer;
the channel penetrates the gate insulating layer, the first insulating layer and the organic insulating layer in a thickness direction of the insulating layer.

In some embodiments, the above display substrate provided in the embodiments of the disclosure further includes: a second inorganic insulating layer located on a side of the first conductive layer away from the base substrate, where the second inorganic insulating layer covers the plurality of transfer terminals.

In some embodiments, the above display substrate provided in the embodiments of the disclosure further includes: a first conductive layer and a second conductive layer arranged in sequence on a side of the insulating layer away from the base substrate and insulated from each other, where the plurality of transfer terminals are located in the second conductive layer.

In some embodiments, in the above display substrate provided in the embodiments of the disclosure, the insulating layer includes a gate insulating layer, a first inorganic insulating layer and an organic insulating layer arranged in sequence on a side of the layer where the first jumper terminals are located facing the first conductive layer, and a second inorganic insulating layer between the first conductive layer and the second conductive layer;
the channel penetrates the gate insulating layer, the first inorganic insulating layer, the organic insulating layer and the second inorganic insulating layer in a thickness direction of the insulating layer.

In some embodiments, the above display substrate provided in the embodiments of the disclosure further includes: a plurality of transistors in the display area and between the first inorganic insulating layer and the base substrate;
the first jumper terminals are arranged in a same layer as sources and drains of the transistors, and the second jumper terminals are arranged in a same layer as gates of the transistors.

In some embodiments, in the above display substrate provided in the embodiments of the disclosure, an area of the transfer terminal between the first jumper terminal and the second jumper terminal is in direct contact with the base substrate, the first jumper terminal and the second jumper terminal.

In some embodiments, in the above display substrate provided in the embodiments of the disclosure, the transfer terminal does not cover an edge of the first jumper terminal away from the second jumper terminal, and the transfer terminal does not cover an edge of the second jumper terminal away from the first jumper terminal.

In some embodiments, in the above display substrate provided in the embodiments of the disclosure, an area of an orthographic projection of the first jumper terminal on the base substrate is less than or equal to 8 μm×5 μm, an area of an orthographic projection of the second jumper terminal on the base substrate is less than or equal to 8 μm×5 μm, and an area of an orthographic projection of the transfer terminal on the base substrate is less than or equal to 20 μm×15 μm.

In another aspect, an embodiment of the disclosure provides a manufacturing method for the above display substrate, including:

providing a base substrate including a display area and a frame area located on at least one side of the display area;

forming a plurality of jumper terminals and a plurality of shift registers arranged in cascade in the frame area, where the plurality of jumper terminals are located between the plurality of shift registers and the display area and include first jumper terminals and second jumper terminals, the first jumper terminals are electrically connected to the shift registers, and the second jumper terminals are located between a layer where the first jumper terminals are located and the base substrate;

forming an insulating layer on an entire surface of a layer where the second jumper terminals are located, and forming a channel exposing the plurality of jumper terminals in an area between the plurality of shift registers and the display area; and forming a plurality of transfer terminals in the channel, so that a first jumper terminal and a second jumper terminal of a same jumper terminal are directly overlapped with a same transfer terminal respectively.

In some embodiments, in the above manufacturing method provided in the embodiments of the disclosure, forming an insulating layer on an entire surface of a layer where the second jumper terminals are located, and forming a channel exposing the plurality of jumper terminals in an area between the plurality of shift registers and the display area, specifically includes:

forming a gate insulating layer, a first inorganic insulating layer and an organic insulating layer stacked on the entire surface of the layer where the second jumper terminals are located;

forming a first channel that penetrates the organic insulating layer in the area between the plurality of shift registers and the display area;

forming a second channel that penetrates the first inorganic insulating layer and the gate insulating layer and exposes the plurality of jumper terminals at the first channel, where the gate insulating layer, the first inorganic insulating layer and the organic insulating layer form the insulating layer, and the first channel and the second channel are connected to form the channel exposing the plurality of jumper terminals.

In some embodiments, in the above manufacturing method provided in the embodiments of the disclosure, forming an insulating layer on an entire surface of a layer where the second jumper terminals are located, and forming a channel exposing the plurality of jumper terminals in an area between the plurality of shift registers and the display area, specifically includes:

forming a gate insulating layer, a first inorganic insulating layer and an organic insulating layer stacked on the entire surface of the layer where the second jumper terminals are located;

forming a first channel that penetrates the organic insulating layer in the area between the plurality of shift registers and the display area;

forming a second channel that penetrates the first inorganic insulating layer and exposes the plurality of first jumper terminals at the first channel;

forming a second inorganic insulating layer on an entire surface of the organic insulating layer;

forming a third channel that penetrates the second inorganic insulating layer and the gate insulating layer and exposes the plurality of jumper terminals at the first channel; where the gate insulating layer, the first inorganic insulating layer, the organic insulating layer and the second inorganic insulating layer form the insulating layer; and the first channel, the second channel and the third channel are connected to form the channel exposing the plurality of jumper terminals.

In another aspect, an embodiment of the disclosure provides a display device, including a display substrate and an opposing substrate opposite to each other, and a liquid crystal layer located between the display substrate and the opposing substrate, where the display substrate is the above display substrate provided in the embodiments of the disclosure, and the liquid crystal layer is located in the display area.

DETAILED DESCRIPTION OF THE EMBODIMENTS

In order to make the purposes, technical solutions and advantages of the disclosure clearer, the technical solutions of the embodiments of the disclosure will be described clearly and completely below in combination with the accompanying drawings of the embodiments of the disclosure. It is necessary to note that the size and shape of each diagram in the accompanying drawings do not reflect the true proportion, and are merely for purpose of schematically illustrating the content of the disclosure. Also, the same or similar reference numbers represent the same or similar elements or the elements having the same or similar functions all the way.

Unless otherwise defined, the technical or scientific terms used in the disclosure shall have the general meanings understood by those ordinary skilled in the art to which the disclosure belongs. The "first", "second" and similar words used in the specification and claims of the disclosure do not represent any order, number or importance, and are only used to distinguish different components. The word such as "include" or "contain" or the like means that the element or object appearing before this word encompasses the elements or objects and their equivalents listed after this word, without excluding other elements or objects. The words such as "inner". "outer". "up". "down" are only used to represent the relative position relationship. When the absolute position of a described object changes, the relative position relationship may also change accordingly.

Figure 1:
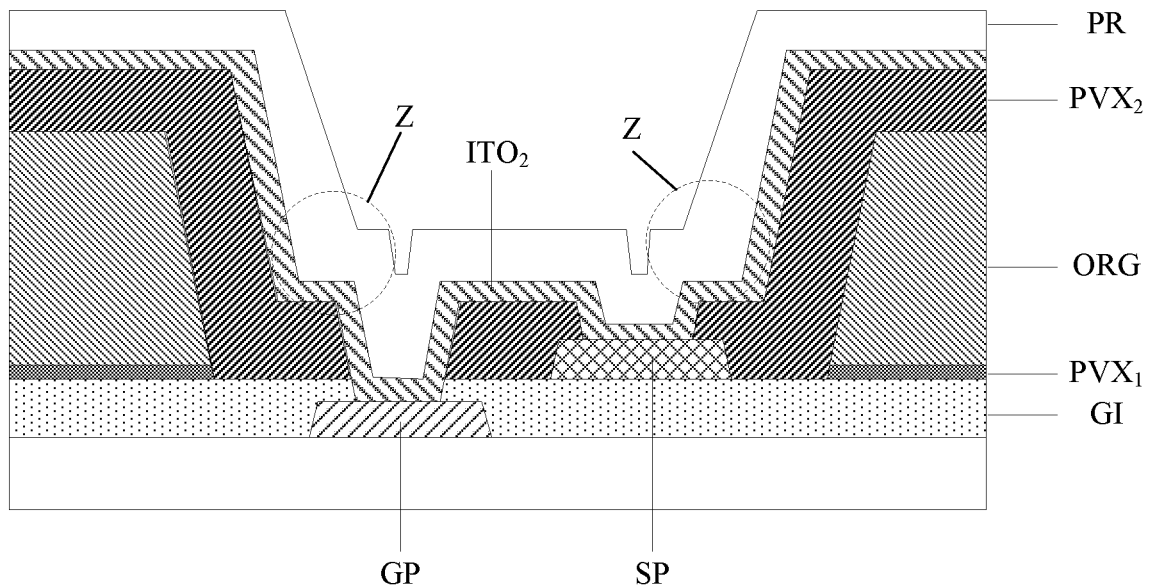
FIG. 1 is a schematic diagram of the principle of short-circuiting of transfer terminals in the related art.
Figure 2:
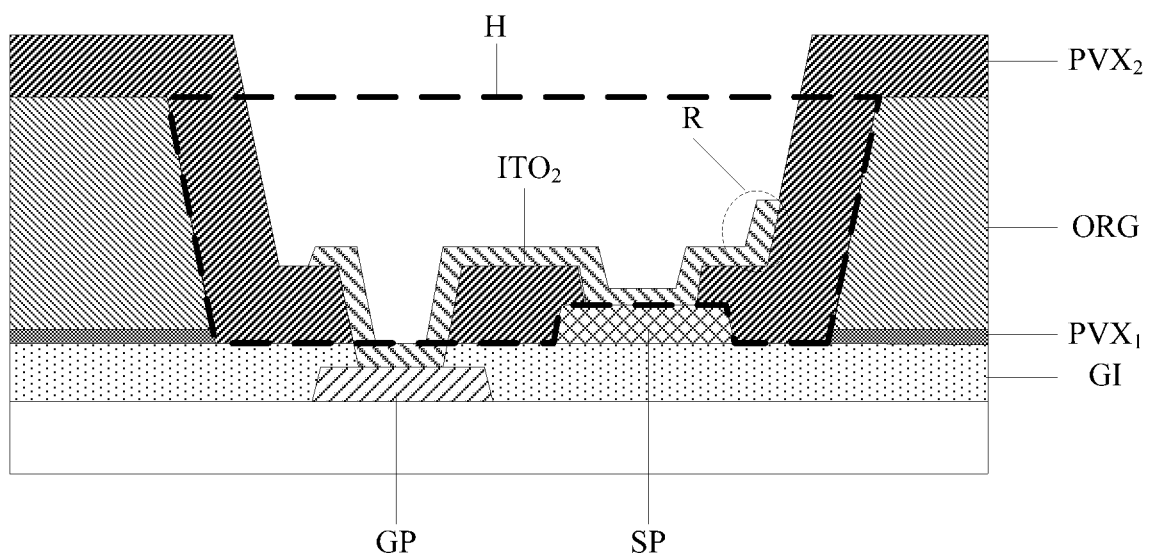
FIG. 2 is a schematic structural diagram of short-circuiting of transfer terminals in the related art.

As shown in FIG. 1 and FIG. 2, a gate drive circuit (GOA) in the related art includes a plurality of shift registers arranged in cascade, and there is a channel H penetrating an organic insulating layer (ORG) and a first inorganic insulating layer ($PVX_1$) between a gate drive circuit area and a display area AA. A first jumper terminal (SD pad, SP) connected to a shift register, a second jumper terminal (Gate pad. GP) connected to a gate line (GL), and a transfer terminal (2ITO pad, $ITO_2$) connecting the first jumper terminal (SP) with the second jumper terminal (GP) are arranged at the channel H; and the transfer terminal ($ITO_2$) is electrically connected to the first jumper terminal (SP) through a via hole penetrating a second inorganic insulating layer ($PVX_2$), and is electrically connected to the second jumper terminal (GP) through a via hole penetrating the second inorganic insulating layer ($PVX_2$) and a gate insulating layer (GI).

However, the disclosure finds that the film layer is high and the step difference is large after the channel H is superimposed with the subsequent second inorganic insulating layer ($PVX_2$) and the layer where the transfer terminal ($ITO_2$) is located, so that the subsequent Photo-Resist (PR) for fabricating the transfer terminal ($ITO_2$) accumulates on the bottom and side walls of the channel H (as shown by the Z area in FIG. 1), resulting in insufficient exposure in the Z area, and then there will be residues R in the Z area (as shown in FIG. 2). The residues R will cause the first connection terminals (SPs) and the second connection terminals (GPs) of the adjacent shift registers to be short-circuited, which is manifested as the half-screen or full-screen horizontal stripe defect on the display device. Some products with a large process margin in the layer where the transfer terminal ($ITO_2$) is located can improve the residual defect by increasing the exposure amount of 5 mj to 10 mj, but this will cause a great pressure on the production capacity of the bottleneck exposure process section of the display substrate. More importantly, the increase in exposure amount will directly lead to the reduction of the slit of the slit electrode arranged on the same layer as the transfer terminal ($ITO_2$) in the display area AA, which cannot meet the original product design specification. At the same time, the tolerance of the product production process is also passively reduced, and the change of the process specification (Spec) of the layer where the transfer terminal ($ITO_2$) is located brings a series of potential risks to the product, such as unevenness (Mura) in the middle and low gray-scale screen, affecting the important product characteristics such as VT symmetry, Gamma curve (involving T-con adjustment and formulation), transmittance, etc.

Figure 3:
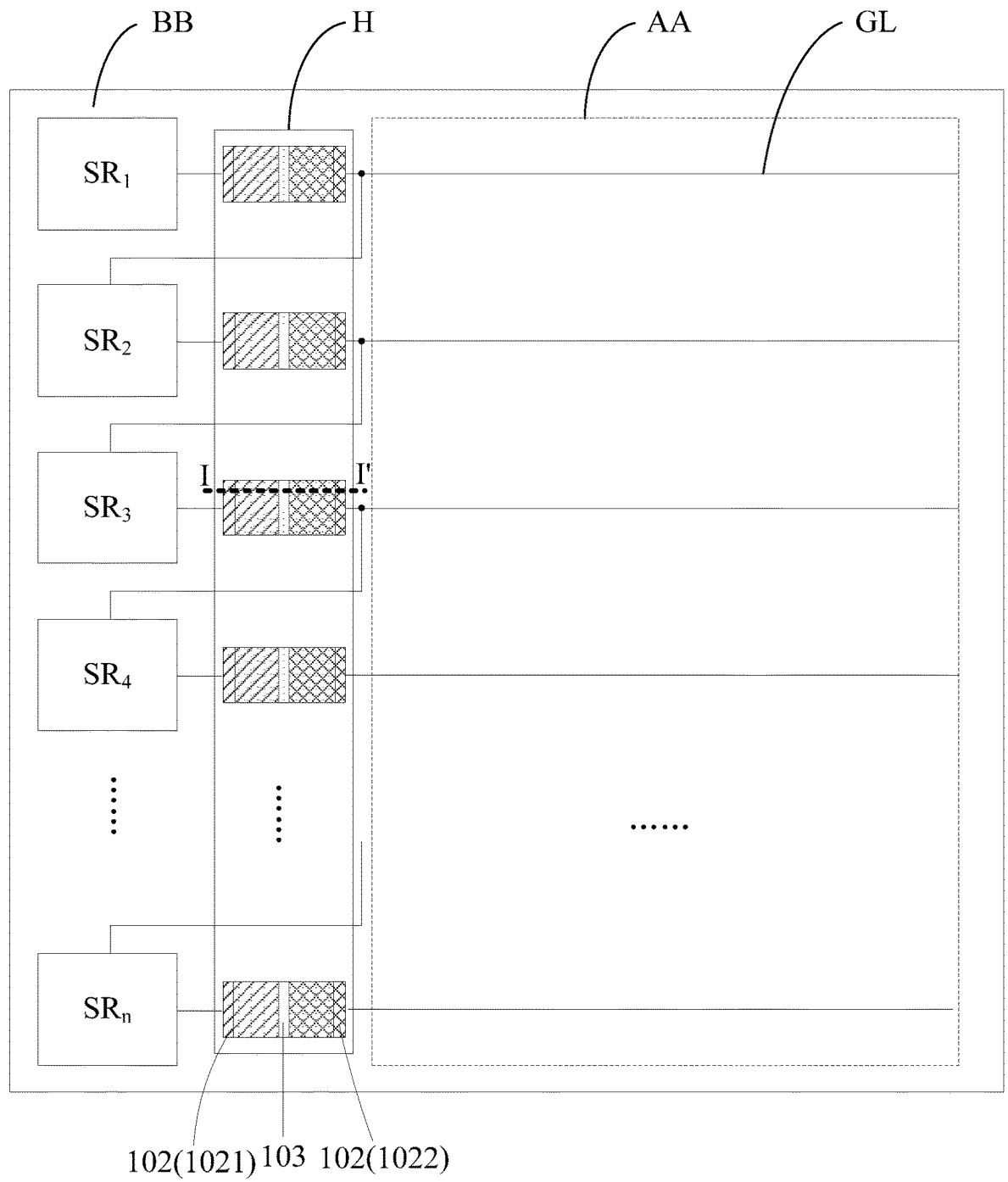
FIG. 3 is a schematic structural diagram of a display substrate according to an embodiment of the disclosure.
Figure 4:
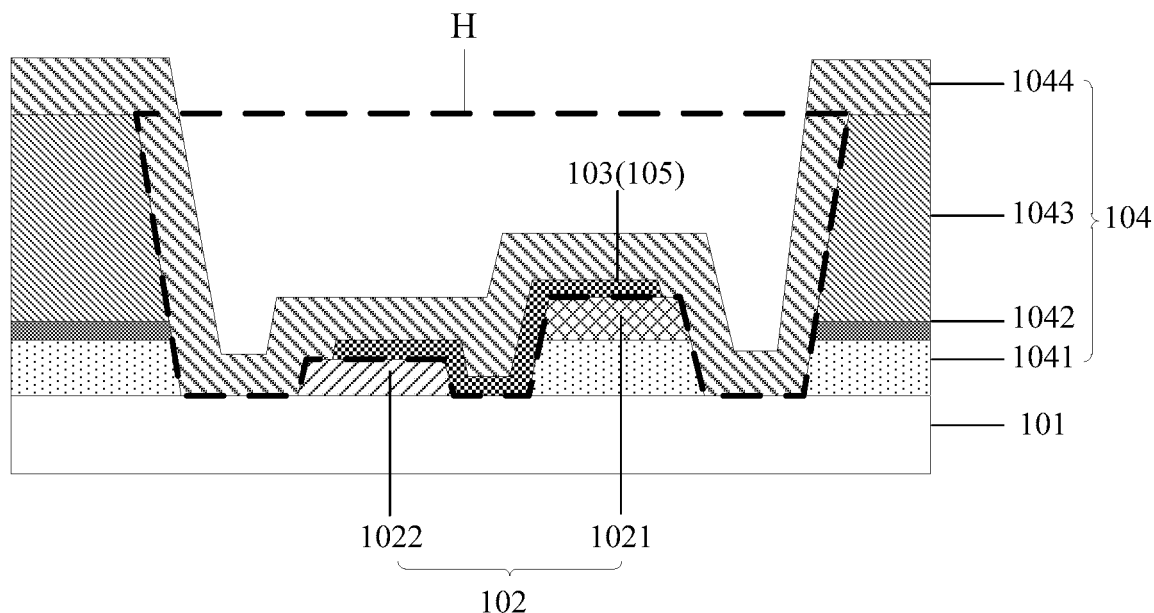
FIG. 4 is a sectional view along the line I-I' in FIG. 3.

In order to improve the above technical problem in the related art, an embodiment of the disclosure provides a display substrate, as shown in FIG. 3 and FIG. 4, including:

a base substrate 101 including a display area AA and a frame area BB located on at least one side of the display area AA;

a plurality of shift registers $SR_n$ (n is a positive integer) located in the frame area BB and arranged in cascade;

a plurality of jumper terminals 102 located between the shift registers $SR_n$ and the display area AA and including first jumper terminals 1021 and second jumper terminals 1022, where the first jumper terminals 1021 are electrically connected to the shift registers $SR_n$, and the second jumper terminals 1022 are located between a layer where the first jumper terminals 1021 are located and the base substrate 101;

a plurality of transfer terminals 103 located between the shift registers $SR_n$ and the display area AA, and located on a side of the layer where the first jumper terminals 1021 are located away from the base substrate 101;

an insulating layer 104 located in the display area AA and the frame area BB, located between a layer where the second jumper terminals 1022 are located and a layer where the plurality of transfer terminals 103 are located, and including a channel H exposing the plurality of jumper terminals 102; where a first jumper terminal 1021 and a second jumper terminal 1022 of a same jumper terminal 102 are directly overlapped with a same transfer terminal 103 respectively in the channel H.

In the above display substrate provided by the embodiments of the disclosure, the transfer terminal 103 is used to directly cover the first jumper terminal 1021 and the second jumper terminal 1022 in the channel H of the insulating layer 104. Compared with the mode in which the transfer terminal 103 is electrically connected to the first jumper terminal 1021 and the second jumper terminal 1022 respectively through via holes in the related art, the manner in the disclosure can ensure that the contact area between the transfer terminal 103 and the first jumper terminal 1021 and/or second jumper terminal 1022 is respectively large, to effectively improve the stability of the electrical connection. In this way, the transfer terminal 103, the first jumper terminal 1021 and the second jumper terminal 1022 can be made smaller, so that the distances from the transfer terminal 103, the first jumper terminal 1021 and the second jumper terminal 1022 to the side walls of the channel H can be designed to be larger. Even if there are residues near the side walls of the channel H, the risk of shorting between the residues and the transfer terminal 103, the first jumper terminal 1021 and the second jumper terminal 1022 can be significantly reduced, thereby effectively solving the horizontal stripe defect caused by the residues, effectively improving the product yield, increasing the product revenue, and also avoiding the changes in product characteristics and potential risks due to the change and review of the specification of the slit electrode in the display area AA after the occurrence of the horizontal stripe defect caused by the residues. Furthermore, the disclosure does not need to increase the exposure amount, so the production pressure of the bottleneck process is effectively relieved, thereby enhancing the production capacity and saving the production cost.

In the related art, in order to enhance the stability of the electrical connection between the transfer terminal 103 and the first jumper terminal 1021 and/or the second jumper terminal 1022, an area of an orthographic projection of the transfer terminal 103 on the base substrate 101 is designed to be 40 μm×30 μm, and areas of orthographic projections of the first jumper terminal 1021 and the second jumper terminal 1022 on the base substrate 101 are respectively 16 μm×10 μm. In the disclosure, the transfer terminal 103 is directly overlapped with the first jumper terminal 1021 and/or the second jumper terminal 1022, thus ensuring that a contact area between the transfer terminal 103 and the first jumper terminal 1021 and/or the second jumper terminal 1022 is relatively large. Therefore, the transfer terminal 103, the first jumper terminal 1021 and the second jumper terminal 1022 can be appropriately reduced in size. Optionally, in the disclosure, the sizes of the transfer terminal 103, the first jumper terminal 1021 and the second jumper terminal 1022 may be less than or equal to half of the sizes in the related art. For example, an area of an orthographic projection of the jumper terminal 1021 on the base substrate 101 may be less than or equal to 8 μm×5 μm, an area of an orthographic projection of the second jumper terminal 1022 on the base substrate 101 may be less than or equal to 8 μm×5 μm, and an area of an orthographic projection of the transfer terminal 103 on the base substrate 101 may be less than or equal to 20 μm×15 μm.

Figure 5:
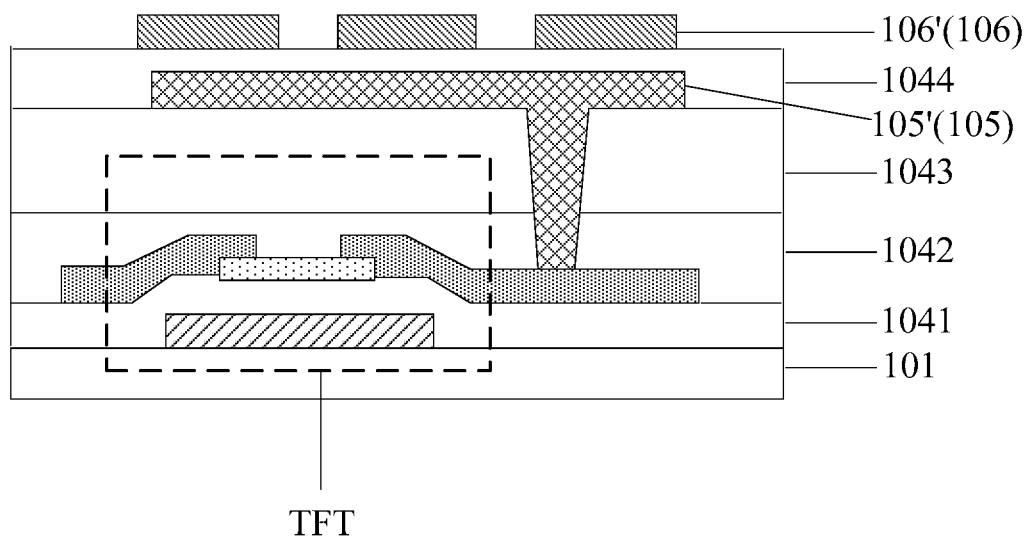
FIG. 5 is a schematic structural diagram of a sub-pixel in the display substrate shown in FIG. 3.

In some embodiments, the above display substrate provided in the embodiments of the disclosure, as shown in FIG. 4 and FIG. 5, may further include: a first conductive layer (1ITO) 105 located on a side of the insulating layer 104 away from the base substrate 101, where the plurality of transfer terminals 103 are located in the first conductive layer 105, so that the material of the first conductive layer 105 in the related art can be used to complete the fabrication of the transfer terminals 103, without the additional material cost and the separate mask process of the transfer terminals 103. In this case, as shown in FIG. 4 and FIG. 5, the insulating layer 104 may include a gate insulating layer 1041, a first inorganic insulating layer 1042 and an organic insulating layer 1043 arranged in sequence on the side of the layer where the second jumper terminals 1022 are located facing the first conductive layer 105; and the channel H penetrates the gate insulating layer 1041, the first insulating layer 1042 and the organic insulating layer 1043 in the thickness direction of the insulating layer 104.

In some embodiments, the above display substrate provided in the embodiments of the disclosure, as shown in FIG. 4 and FIG. 5, may further include: a second inorganic insulating layer 1044 located on the side of the first conductive layer 105 away from the base substrate 101, where the second inorganic insulating layer 1044 covers the plurality of transfer terminals 103, so that the second inorganic insulating layer 1044 is used as a package protection layer for the transfer terminals 103, effectively improving the stability of the transfer terminals 103.

Figure 6:
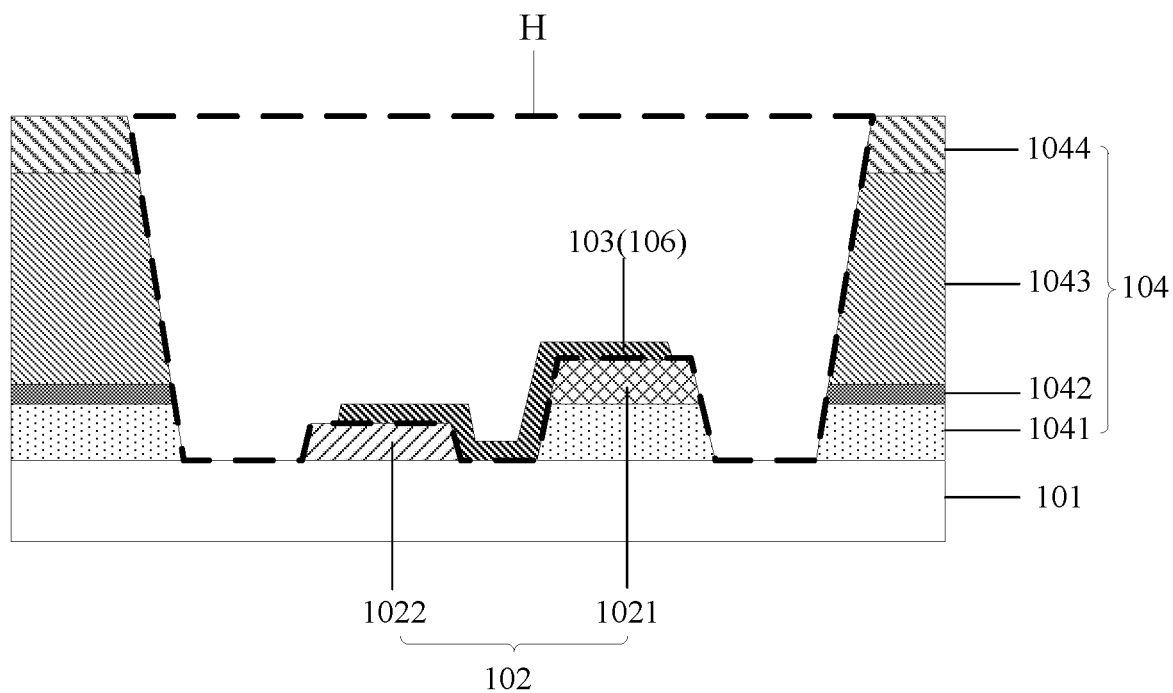
FIG. 6 is another sectional view along the line I-I' in FIG. 3.

In some embodiments, the above display substrate provided in the embodiments of the disclosure, as shown in FIG. 5 and FIG. 6, may further include: a first conductive layer 105 and a second conductive layer (2ITO) 106 arranged in sequence on a side of the insulating layer 104 away from the base substrate 101 and insulated from each other, where the plurality of transfer terminals 103 may be located in the second conductive layer 106, so that the material of the second conductive layer 106 in the related art can be used to complete the fabrication of the transfer terminals 103, without the additional material cost and the separate mask process of the transfer terminals 103. In this case, as shown in FIG. 5 and FIG. 6, the insulating layer 104 may include a gate insulating layer 1041, a first inorganic insulating layer 1042, an organic insulating layer 1043 and a second inorganic insulating layer 1044 arranged in sequence on the side of the layer where the second jumper terminals 1022 are located facing the first conductive layer 105; and the channel H penetrates the gate insulating layer 1041, the first insulating layer 1042, the organic insulating layer 1043 and the second inorganic insulating layer 1044 in the thickness direction of the insulating layer 104.

In some embodiments, in the above display substrate provided in the embodiments of the disclosure, as shown in FIG. 4 and FIG. 6, the area of the transfer terminal 103 between the first jumper terminal 1021 and the second jumper terminal 1022 is in direct contact with the base substrate 101, the first jumper terminal 1021 and the second jumper terminal 1022, so that the transfer terminal 103 is arranged in contact with the upper surface of the first jumper terminal 1021 away from the base substrate 101, the side surface of the first jumper terminal 1021, the upper surface of the second jumper terminal 1022 away from the base substrate 101, and the side surface of the second jumper terminal 1022, further increasing the contact area between the transfer terminal 103 and the first jumper terminal 1021 and/or the second jumper terminal 1022, and thus further reducing the sizes of the transfer terminal 103, the first jumper terminal 1021 and the second jumper terminal 1022, and solving the problem of horizontal stripe defect caused by residues in the related art.

In some embodiments, in the above display substrate provided in the embodiments of the disclosure, as shown in FIG. 3, FIG. 4 and FIG. 6, the transfer terminal 103 does not cover an edge of the first jumper terminal 1021 away from the second jumper terminal 1022, and the transfer terminal 103 does not cover an edge of the second jumper terminal 1022 away from the first jumper terminal 1021, which is more conducive to etching and forming the transfer terminal 103, and avoiding residues on the bottom of the channel H and the side wall of the channel H in the process of etching and forming the transfer terminal 103.

In some embodiments, the above display substrate provided in the embodiments of the disclosure, as shown in FIG. 4 to FIG. 6, may further include: a plurality of transistors TFT in the display area AA and between the first inorganic insulating layer 1042 and the base substrate 101; where the first jumper terminals 1021 may be arranged in the same layer as the sources and drains of the transistors TFT, and the second jumper terminals 1022 may be arranged in the same layer as the gates of the transistors TFT, so that the material of the sources and drains of the transistors TFT can be used to complete the fabrication of the first jumper terminals 1021, and the material of the gates of the transistors TFT can be used to complete the fabrication of the second jumper terminals 1022, without the additional material cost and the separate mask process of the first jumper terminals 1021 and the second jumper terminals 1022.

It should be noted that "arranged in the same layer" in the disclosure refers to using the same film-forming process to form a film layer for making a specific pattern, and then using the same mask to form a layer structure through a single patterning process. That is, one patterning process corresponds to one mask (also called photomask). According to different specific patterns, one patterning process may include multiple exposure, development or etching processes, and the specific patterns in the formed layer structure may be continuous or discontinuous. These specific patterns may be at the same height or have the same thickness, or may be at different heights or have different thicknesses.

Optionally, the transistor TFT provided in the embodiments of the disclosure may be a Thin Film Transistor (TFT) or a Metal Oxide Semiconductor field effect transistor (MOS), which is not limited here. The transistor TFT may be a P-type transistor or an N-type transistor. In a specific implementation, the P-type transistor is turned on when the voltage difference $V_{gs}$ between its gate and source and its threshold voltage $V_{th}$ satisfy the relationship $V_{gs} < V_{th}$, and is turned off when satisfying the relationship $V_{gs} \geq V_{th}$; and the N-type transistor is turned on when the voltage difference $V_{gs}$ between its gate and source and its threshold voltage $V_{th}$ satisfy the relationship $V_{gs} > V_{th}$, and is turned off when satisfying the relationship $V_{gs} \leq V_{th}$. Furthermore, the active layer of the transistor TFT may be an amorphous-Silicon (a-Si) active layer, a Poly-Silicon (P-Si) active layer or an oxide (IGZO) active layer, which is not limited here. The transistor TFT may be a bottom-gate transistor, a top-gate transistor or a double-gate transistor, which is not limited here.

Based on the same inventive concept, an embodiment of the disclosure provides a manufacturing method for the above display substrate. Since the principle of the manufacturing method to solve the problem is similar to the principle of the above display substrate to solve the problem, so the implementations of the manufacturing method provided in the embodiments of the disclosure can refer to the implementations of the above display substrate provided in the embodiments of the disclosure, and the repeated description thereof will be omitted.

Specifically, an embodiment of the disclosure provides a manufacturing method for the above display substrate, including the following operations:

providing a base substrate including a display area and a frame area located on at least one side of the display area;

forming a plurality of jumper terminals and a plurality of shift registers arranged in cascade in the frame area, where the plurality of jumper terminals are located between the plurality of shift registers and the display area and include first jumper terminals and second jumper terminals, the first jumper terminals are electrically connected to the shift registers, and the second jumper terminals are located between a layer where the first jumper terminals are located and the base substrate;

forming an insulating layer on an entire surface of a layer where the second jumper terminals are located, and forming a channel exposing the plurality of jumper terminals in an area between the plurality of shift registers and the display area; and forming a plurality of transfer terminals in the channel, so that the first jumper terminal and the second jumper terminal of the same jumper terminal are directly overlapped with the same transfer terminal respectively.

Figure 7:
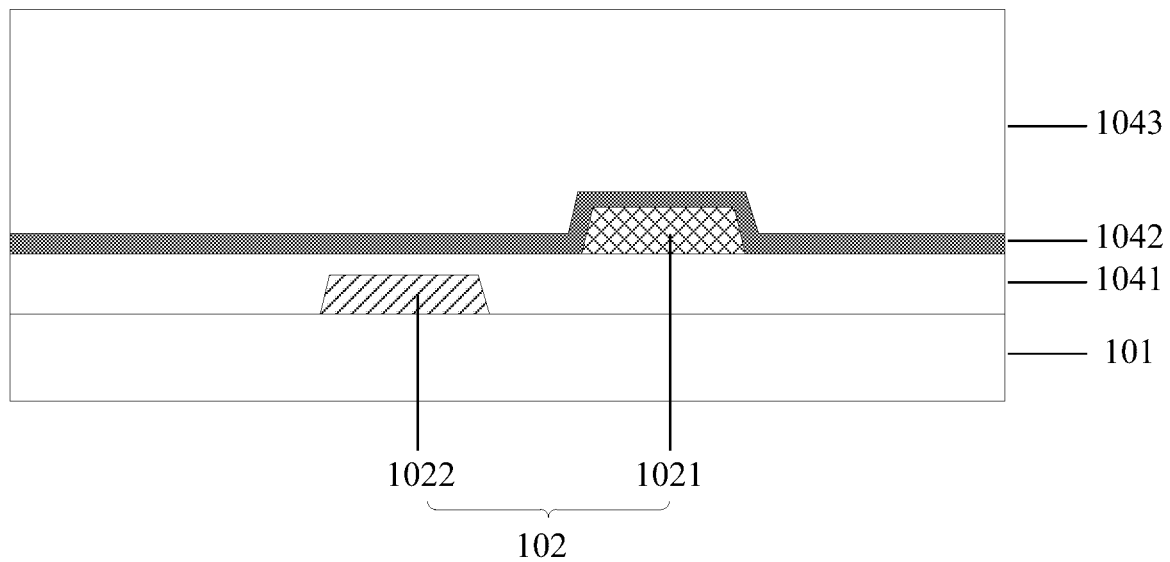
FIG. 7 is a schematic structural diagram of the display substrate shown in FIG. 4 and FIG. 6 in the manufacturing process.
Figure 8:
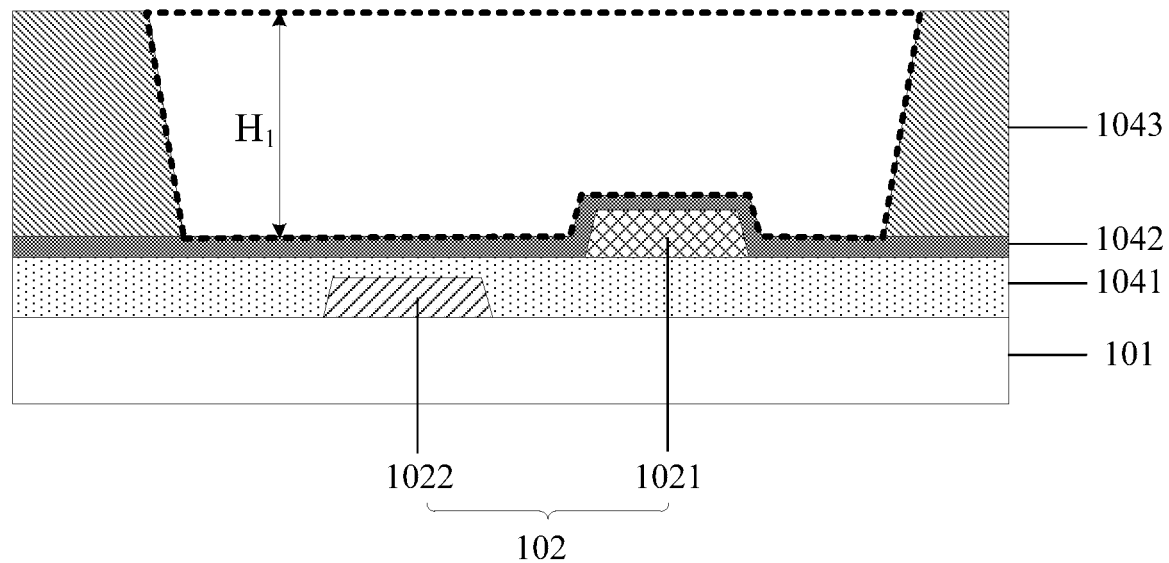
FIG. 8 is another schematic structural diagram of the display substrate shown in FIG. 4 and FIG. 6 in the manufacturing process.
Figure 9:
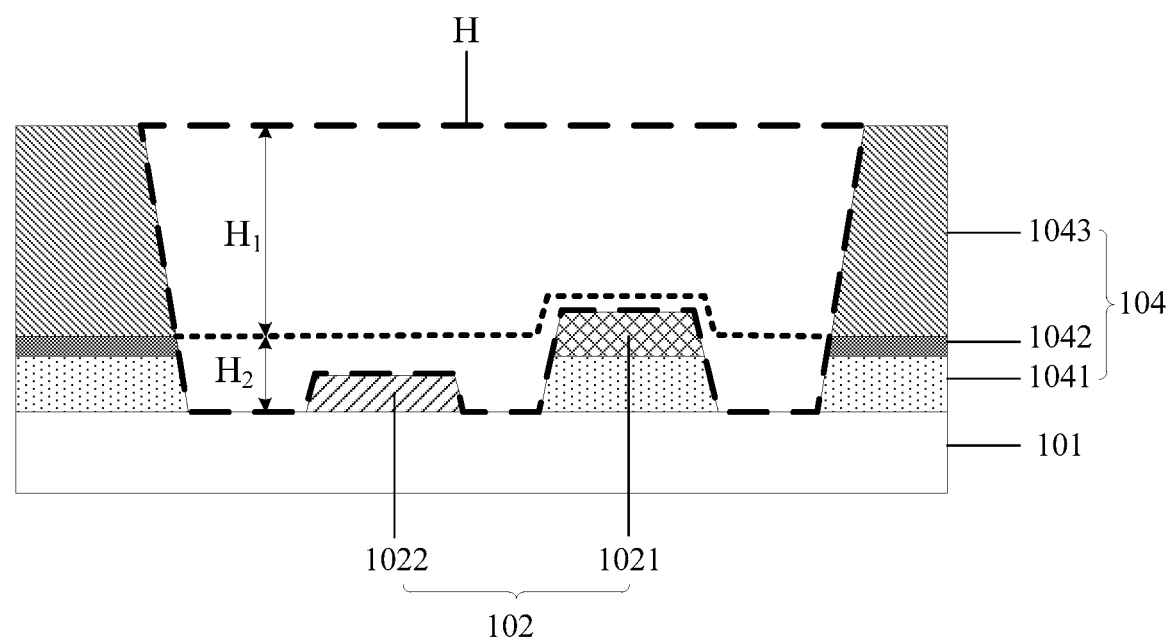
FIG. 9 is another schematic structural diagram of the display substrate shown in FIG. 4 in the manufacturing process.

In some embodiments, in the above manufacturing method provided in the embodiments of the disclosure, the operation of forming an insulating layer on an entire surface of a layer where the second jumper terminals are located, and forming a channel exposing the plurality of jumper terminals in an area between the plurality of shift registers and the display area, may be specifically implemented in the following way:

Step 1: as shown in FIG. 7, forming a gate insulating layer 1041, a first inorganic insulating layer 1042 and an organic insulating layer 1043 stacked on the entire surface of the layer where the second jumper terminals 1022 are located;

Step 2: as shown in FIG. 8, forming a first channel $H_1$ that penetrates the organic insulating layer 1043 in the area between the plurality of shift registers $SR_n$ and the display area AA;

Step 3: as shown in FIG. 9, forming a second channel $H_2$ that penetrates the first inorganic insulating layer 1042 and the gate insulating layer 1041 and exposes the plurality of jumper terminals 102 (including the first jumper terminals 1021 and the second jumper terminals 1022) at the first channel $H_1$, where the gate insulating layer 1041, the first inorganic insulating layer 1042 and the organic insulating layer 1043 form the insulating layer 104, and the first channel $H_1$ and the second channel $H_2$ are connected to form the channel H exposing the plurality of jumper terminals 102.

Figure 10:
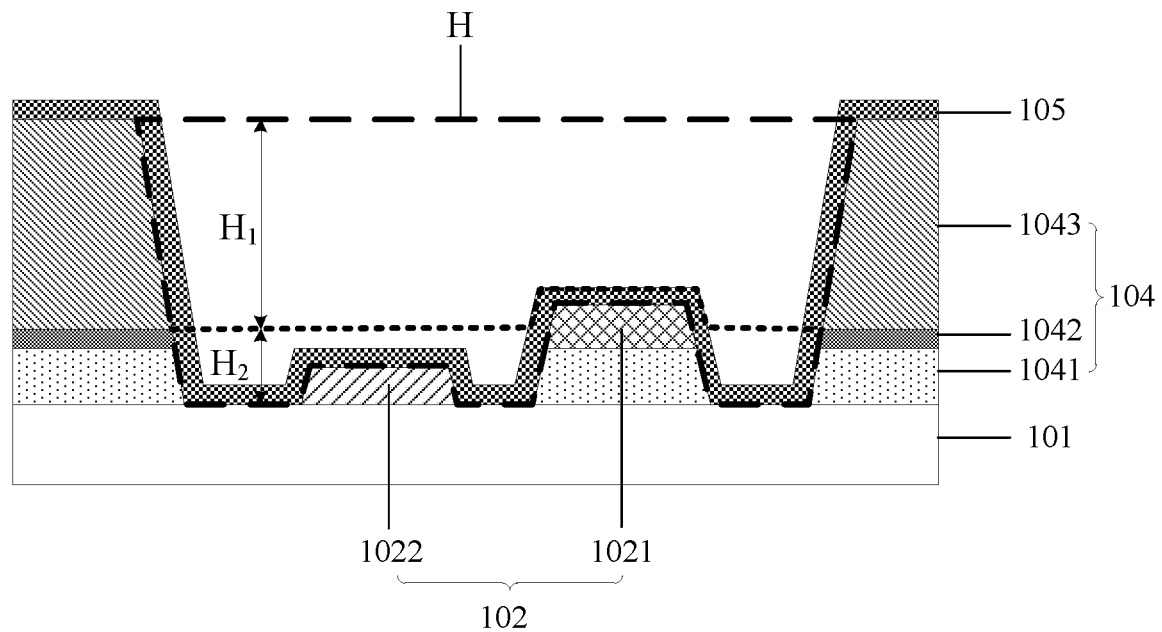
FIG. 10 is another schematic structural diagram of the display substrate shown in FIG. 4 in the manufacturing process.
Figure 11:
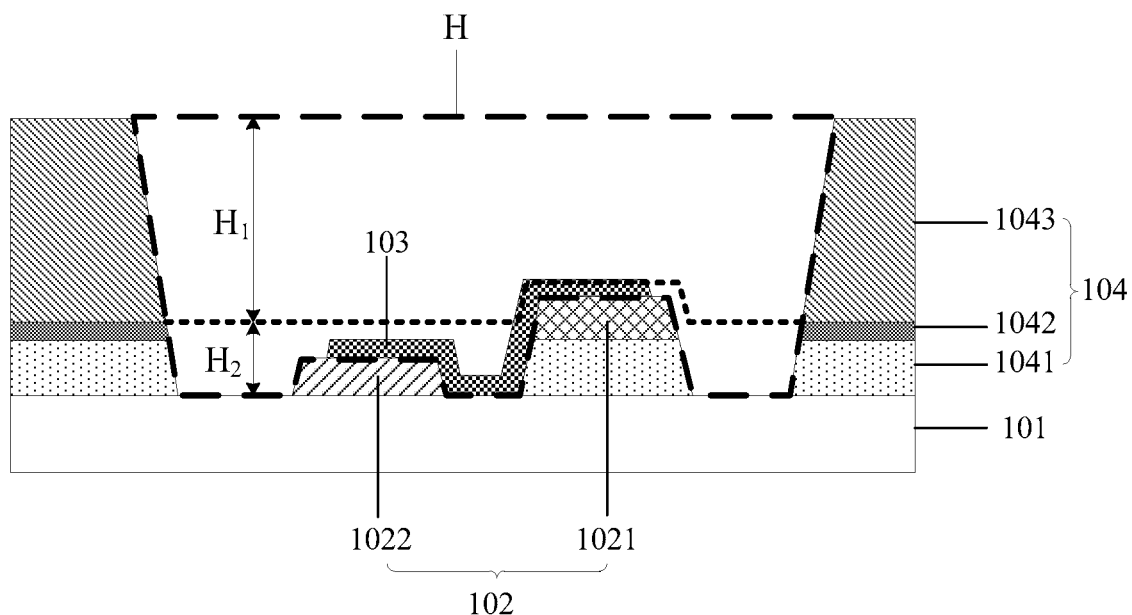
FIG. 11 is another schematic structural diagram of the display substrate shown in FIG. 4 in the manufacturing process.

Optionally, as shown in FIG. 10, after the channel H exposing the plurality of jumper terminals 102 is formed in the insulating layer 104, it is also possible to form a first conductive layer 105 on the entire surface of the organic insulating layer 1043, and pattern the first conductive layer 105 to form the transfer terminals 103 directly covering the first jumper terminals 1021 and the second jumper terminals 1022 in the channel H (as shown in FIG. 11); and at the same time, it is also possible to form a plurality of pixel electrodes 105' in the display area AA (as shown in FIG. 5). Then, as shown in FIG. 4, a second inorganic insulating layer 1044 may be formed on the entire surface of the first conductive layer 105, so that the second inorganic insulating layer 1044 protects the transfer terminals 103 in the frame area BB, and simultaneously realizes the mutual insulation between the pixel electrodes 105' and the subsequent common electrode 106' (as shown in FIG. 5). For the preparation of the pixel electrodes 105' and the common electrode 106', reference may be made to the related technology, which will not be repeated here.

Figure 12:
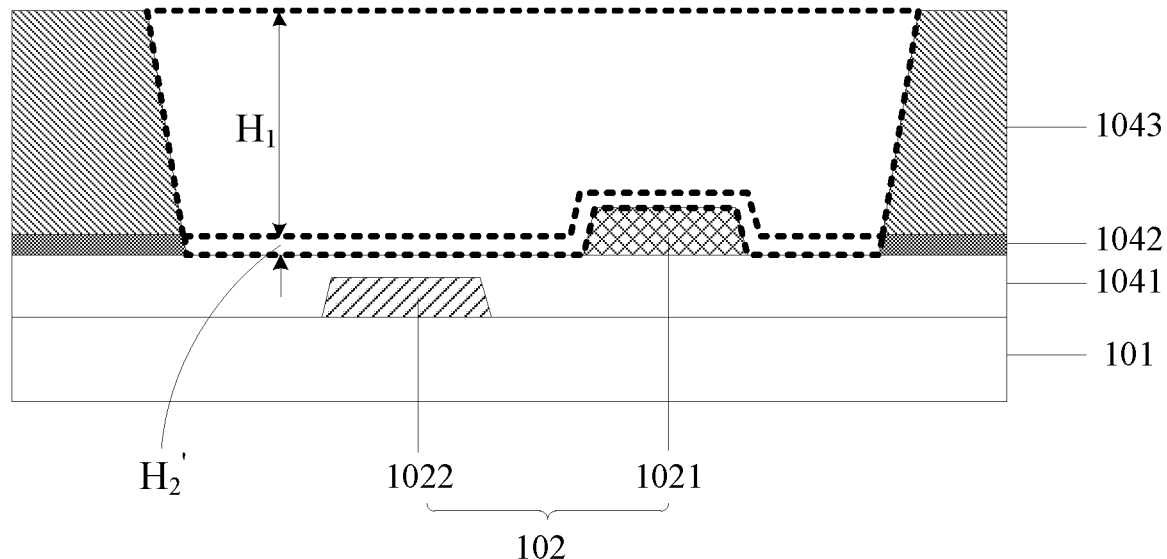
FIG. 12 is another schematic structural diagram of the display substrate shown in FIG. 6 in the manufacturing process.
Figure 13:
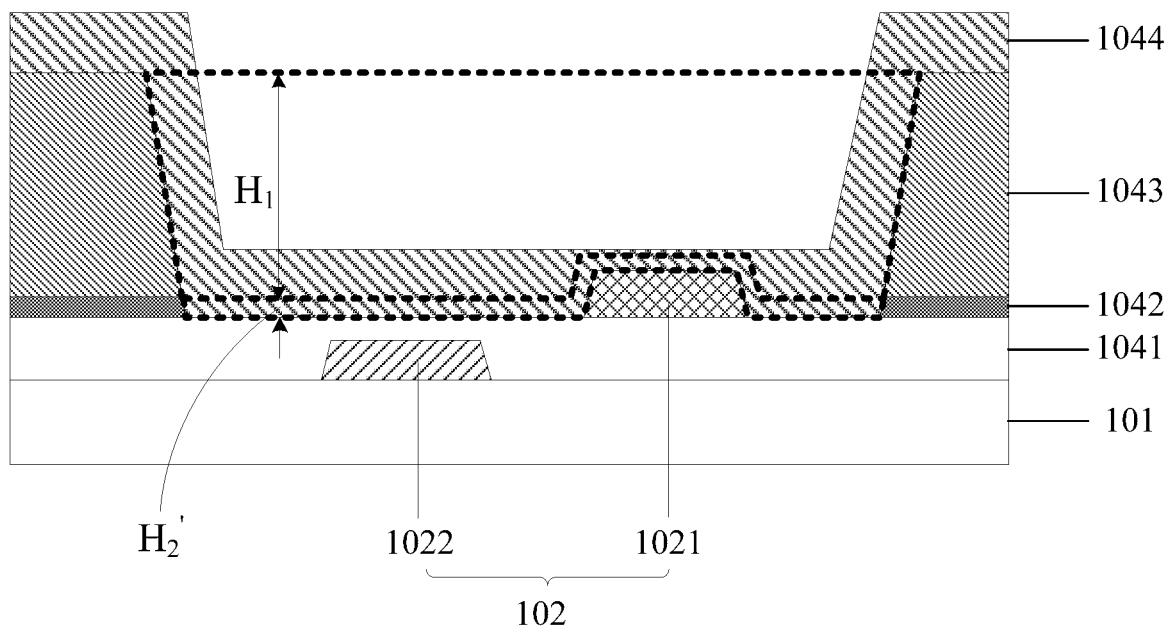
FIG. 13 is another schematic structural diagram of the display substrate shown in FIG. 6 in the manufacturing process.
Figure 14:
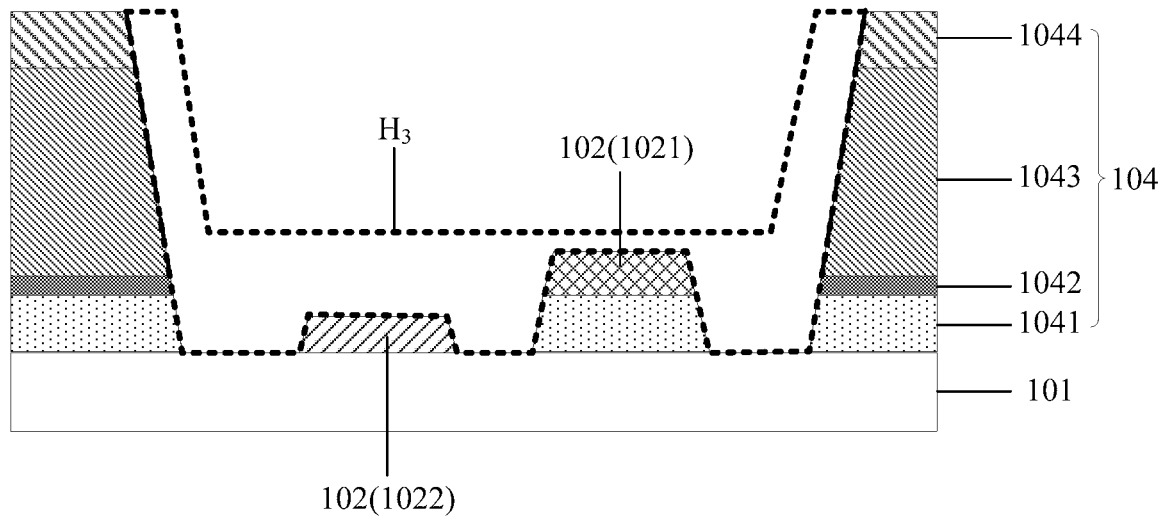
FIG. 14 is another schematic structural diagram of the display substrate shown in FIG. 6 in the manufacturing process.

In some embodiments, in the above manufacturing method provided in the embodiments of the disclosure, the operation of forming an insulating layer on an entire surface of a layer where the second jumper terminals are located, and forming a channel exposing the plurality of jumper terminals in an area between the plurality of shift registers and the display area, may also be implemented in the following way:

Step 1: as shown in FIG. 7, forming a gate insulating layer 1041, a first inorganic insulating layer 1042 and an organic insulating layer 1043 stacked on the entire surface of the layer where the second jumper terminals 1022 are located;

Step 2: as shown in FIG. 8, forming a first channel $H_1$ that penetrates the organic insulating layer 1043 in the area between the plurality of shift registers $SR_n$ and the display area AA;

Step 3: as shown in FIG. 12, forming a second channel $H_2'$ that penetrates the first inorganic insulating layer 1042 and exposes the plurality of first jumper terminals 1021 at the first channel $H_1$;

Step 4: as shown in FIG. 13, forming a second inorganic insulating layer 1044 on the entire surface of the organic insulating layer 1043;

Step 5: as shown in FIG. 14, forming a third channel $H_3$ that penetrates the second inorganic insulating layer 1044 and the gate insulating layer 1041 and exposes the plurality of jumper terminals 102 at the first channel $H_1$; where the gate insulating layer 1041, the first inorganic insulating layer 1042, the organic insulating layer 1043 and the second inorganic insulating layer 1044 form the insulating layer 104; and the first channel $H_1$, the second channel $H_2$ and the third channel $H_3$ are connected to form the channel H exposing the plurality of jumper terminals 102.

Figure 15:
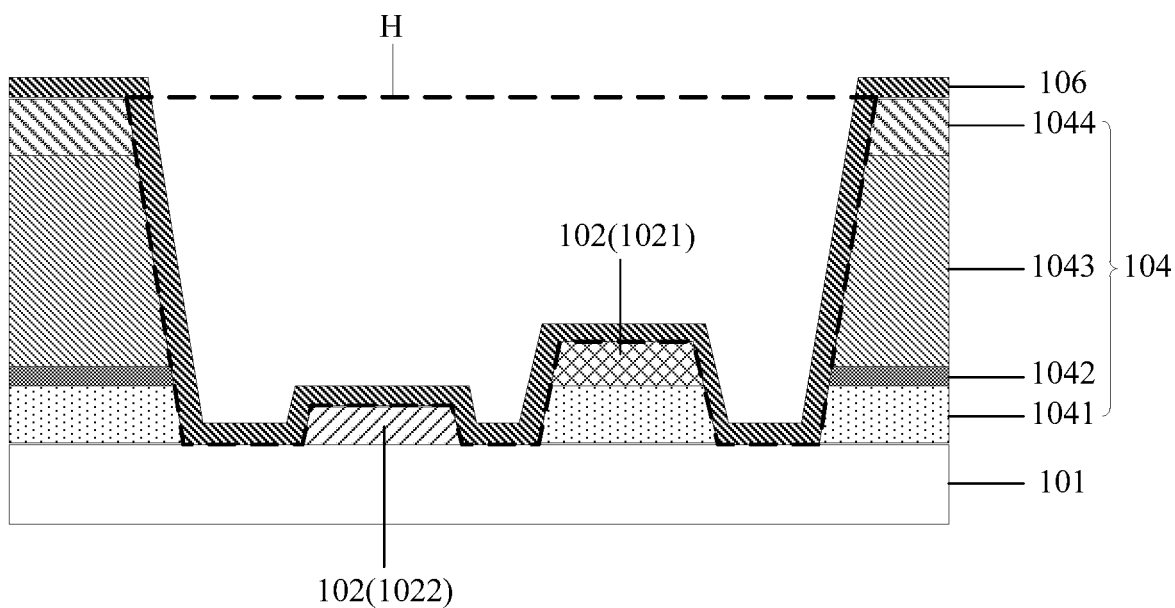
FIG. 15 is another schematic structural diagram of the display substrate shown in FIG. 6 in the manufacturing process.

Optionally, as shown in FIG. 15, after the channel H exposing the plurality of jumper terminals 102 is formed in the insulating layer 104, it is also possible to form a second conductive layer 106 on the entire surface of the second inorganic insulating layer 1044, and pattern the second conductive layer 106 to form the transfer terminals 103 directly covering the first jumper terminals 1021 and the second jumper terminals 1022 in the channel H (as shown in FIG. 6); and at the same time, it is also possible to form a slit-shaped common electrode 106' in the display area AA (as shown in FIG. 5).

It should be noted that the manufacturing processes of the shift register $SR_n$, the transistor TFT electrically connected to the pixel electrode 105' in the display area AA, the first jumper terminal 1021 and the second jumper terminal 1022 in the disclosure can refer to the related art, which will not be repeated here.

Figure 16:
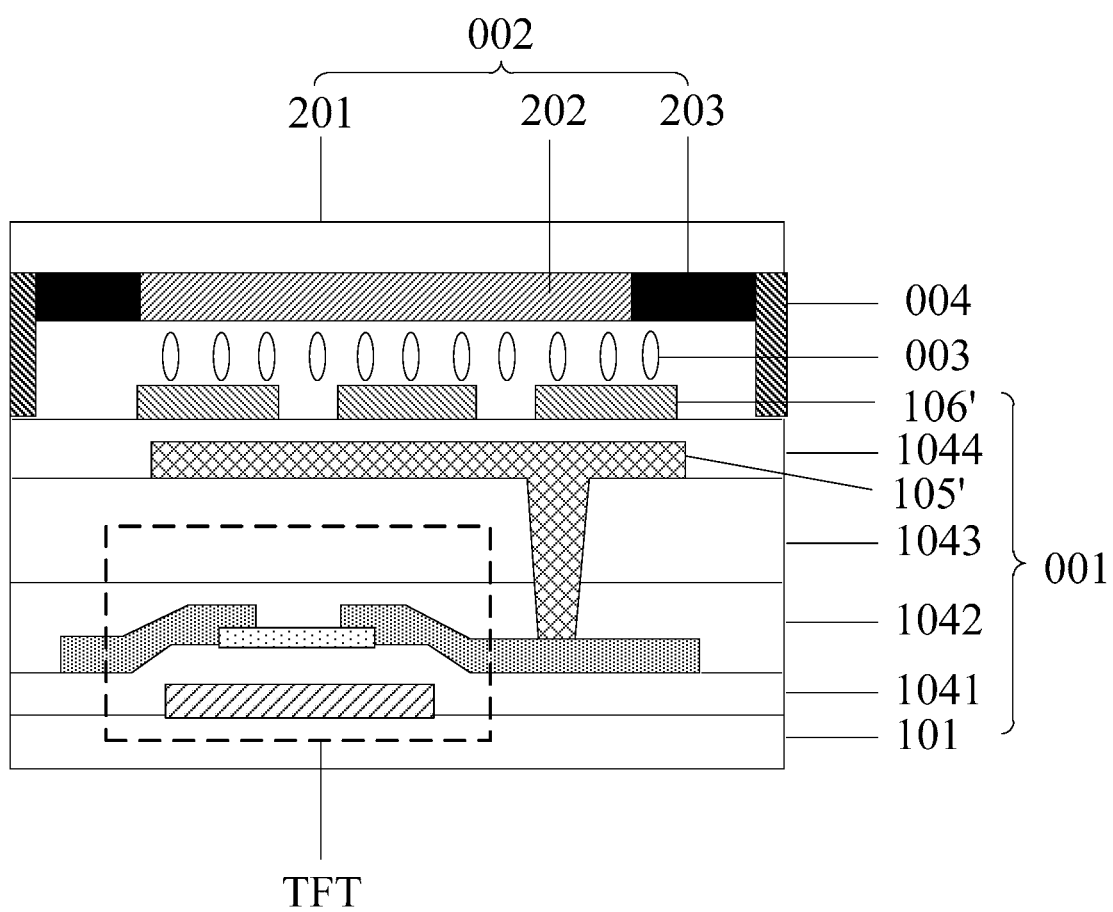
FIG. 16 is a schematic structural diagram of a sub-pixel in a display panel according to an embodiment of the disclosure.

Based on the same inventive concept, an embodiment of the disclosure provides a display device, as shown in FIG. 16, including a display substrate 001 and an opposing substrate 002 opposite to each other, and a liquid crystal layer 003 located between the display substrate 001 and the opposing substrate 002, where the display substrate 001 is the above display substrate 001 provided in the embodiments of the disclosure, and the liquid crystal layer 003 is located in the display area AA. Since the principle of the display device to solve the problem is similar to the principle of the above display substrate to solve the problem, the implementations of the display device provided in the embodiments of the disclosure can refer to the implementations of the above display substrate provided in the embodiments of the disclosure, and the repeated description thereof will be omitted.

In some embodiments, in the above display device provided in the embodiments of the disclosure, as shown in FIG. 16, the opposing substrate 002 may include a glass substrate 201, a color resist 202, a black matrix 203, etc.; and the display device may further include a frame sealant 004, etc. All of other indispensable components of the display device should be understood by those ordinary skilled in the art to be included, and will be omitted here and should not be considered as limitations on the disclosure.

In some embodiments, the above display device according to the embodiments of the disclosure may be: mobile phone, tablet computer, television, display, notebook computer, digital photo frame, navigator, smart watch, fitness wristband, personal digital assistant, and any other product or component with display function. The display device includes but not limited to: a radio frequency unit, a network module, an audio output & input unit, a sensor, a display unit, a user input unit, an interface unit, a memory, a processor, a power supply, etc.

Evidently, those skilled in the art can make various modifications and variations to the embodiments of the disclosure without departing from the spirit and scope of the embodiments of the disclosure. Thus, the disclosure is also intended to encompass these modifications and variations to the embodiments of the disclosure as long as these modifications and variations come into the scope of the claims of the disclosure and their equivalents.

What is claimed is:

1. A display substrate, comprising:
a base substrate comprising a display area and a frame area located on at least one side of the display area;
a plurality of shift registers located in the frame area and arranged in cascade;
a plurality of jumper terminals located between the shift registers and the display area and comprising first jumper terminals and second jumper terminals, wherein the first jumper terminals are electrically connected to the shift registers, and the second jumper terminals are located between a layer where the first jumper terminals are located and the base substrate;
a plurality of transfer terminals located between the shift registers and the display area, and located on a side of the layer where the first jumper terminals are located away from the base substrate; and
an insulating layer located in the display area and the frame area, located between a layer where the second jumper terminals are located and a layer where the plurality of transfer terminals are located, and comprising one channel exposing the first jumper terminals and the second jumper terminals; wherein a first jumper terminal and a second jumper terminal of a same jumper terminal are directly overlapped with a same transfer terminal respectively in the one channel;
wherein the first jumper terminal comprises a first side surface close to the second jumper terminal and a first upper surface; the second jumper terminal comprises a second side surface close to the first jumper terminal and a second upper surface;
the first jumper terminal and the second jumper terminal of the same jumper terminal are directly overlapped with the same transfer terminal respectively in the one channel, which comprises:
the transfer terminal is in direct contact with at least a part of the first upper surface of the first jumper terminal and the first side surface of the first jumper terminal; in an area between the first jumper terminal and the second jumper terminal, the transfer terminal is in direct contact with at least a part of a third upper surface of the base substrate; and the transfer terminal is in direct contact with the second side surface of the second jumper terminal and at least a part of the second upper surface of the second jumper terminal.

2. The display substrate according to claim 1, further comprising: a first conductive layer located on a side of the insulating layer away from the base substrate, wherein the plurality of transfer terminals are located in the first conductive layer.

3. The display substrate according to claim 2, wherein the insulating layer comprises a gate insulating layer, a first inorganic insulating layer and an organic insulating layer arranged in sequence on a side of the layer where the second jumper terminals are located facing the first conductive layer; and
the channel penetrates the gate insulating layer, the first inorganic insulating layer and the organic insulating layer in a thickness direction of the insulating layer.

4. The display substrate according to claim 3, further comprising: a second inorganic insulating layer located on a side of the first conductive layer away from the base substrate, wherein the second inorganic insulating layer covers the plurality of transfer terminals.

5. The display substrate according to claim 1, further comprising: a first conductive layer and a second conductive layer arranged in sequence on a side of the insulating layer away from the base substrate and insulated from each other, wherein the plurality of transfer terminals are located in the second conductive layer.

6. The display substrate according to claim 5, wherein the insulating layer comprises a gate insulating layer, a first inorganic insulating layer and an organic insulating layer arranged in sequence on a side of the layer where the first jumper terminals are located facing the first conductive layer, and a second inorganic insulating layer between the first conductive layer and the second conductive layer;
the channel penetrates the gate insulating layer, the first inorganic insulating layer, the organic insulating layer and the second inorganic insulating layer in a thickness direction of the insulating layer.

7. The display substrate according to claim 3, further comprising a plurality of transistors in the display area and between the first inorganic insulating layer and the base substrate;
the first jumper terminals are arranged in a same layer as sources and drains of the transistors, and the second jumper terminals are arranged in a same layer as gates of the transistors.

8. The display substrate according to claim 1, wherein the transfer terminal does not cover an edge of the first jumper terminal away from the second jumper terminal, and the transfer terminal does not cover an edge of the second jumper terminal away from the first jumper terminal.

9. The display substrate according to claim 1, wherein an area of an orthographic projection of the first jumper terminal on the base substrate is less than or equal to 8 µm×5 µm, an area of an orthographic projection of the second jumper terminal on the base substrate is less than or equal to 8 µm×5 µm, and an area of an orthographic projection of the transfer terminal on the base substrate is less than or equal to 20 µm×15 µm.

10. The display substrate according to claim 1, wherein along an arrangement direction of the plurality of shift registers, the one channel penetrates the insulating layer and exposes all the first jumper terminals and all the second jumper terminals.

11. A display device, comprising a display substrate and an opposing substrate opposite to each other, and a liquid crystal layer located between the display substrate and the opposing substrate, and the liquid crystal layer is located in the display area, wherein the display substrate comprises:
a base substrate comprising a display area and a frame area located on at least one side of the display area;
a plurality of shift registers located in the frame area and arranged in cascade;
a plurality of jumper terminals located between the shift registers and the display area and comprising first jumper terminals and second jumper terminals, wherein the first jumper terminals are electrically connected to the shift registers, and the second jumper terminals are located between a layer where the first jumper terminals are located and the base substrate;
a plurality of transfer terminals located between the shift registers and the display area, and located on a side of the layer where the first jumper terminals are located away from the base substrate; and
an insulating layer located in the display area and the frame area, located between a layer where the second jumper terminals are located and a layer where the plurality of transfer terminals are located, and comprising one channel exposing the first jumper terminals and the second jumper terminals; wherein a first jumper terminal and a second jumper terminal of a same jumper terminal are directly overlapped with a same transfer terminal respectively in the one channel;
wherein the first jumper terminal comprises a first side surface close to the second jumper terminal and a first upper surface; the second jumper terminal comprises a second side surface close to the first jumper terminal and a second upper surface;
the first jumper terminal and the second jumper terminal of the same jumper terminal are directly overlapped with the same transfer terminal respectively in the one channel, which comprises:
the transfer terminal is in direct contact with at least a part of the first upper surface of the first jumper terminal and the first side surface of the first jumper terminal; in an area between the first jumper terminal and the second jumper terminal, the transfer terminal is in direct contact with at least a part of a third upper surface of the base substrate; and the transfer terminal is in direct contact with the second side surface of the second jumper terminal and at least a part of the second upper surface of the second jumper terminal.

12. The display device according to claim 11, wherein the display substrate further comprises: a first conductive layer located on a side of the insulating layer away from the base substrate, wherein the plurality of transfer terminals are located in the first conductive layer.

13. The display device according to claim 12, wherein the insulating layer comprises a gate insulating layer, a first inorganic insulating layer and an organic insulating layer arranged in sequence on a side of the layer where the second jumper terminals are located facing the first conductive layer; and
the channel penetrates the gate insulating layer, the first inorganic insulating layer and the organic insulating layer in a thickness direction of the insulating layer.

14. The display device according to claim 13, wherein the display substrate further comprises: a second inorganic insulating layer located on a side of the first conductive layer away from the base substrate, wherein the second inorganic insulating layer covers the plurality of transfer terminals.

15. The display device according to claim 11, wherein the display substrate further comprises: a first conductive layer and a second conductive layer arranged in sequence on a side of the insulating layer away from the base substrate and insulated from each other, wherein the plurality of transfer terminals are located in the second conductive layer.

16. The display device according to claim 15, wherein the insulating layer comprises: a gate insulating layer, a first inorganic insulating layer and an organic insulating layer arranged in sequence on a side of the layer where the first jumper terminals are located facing the first conductive layer, and a second inorganic insulating layer between the first conductive layer and the second conductive layer;
the channel penetrates the gate insulating layer, the first inorganic insulating layer, the organic insulating layer and the second inorganic insulating layer in a thickness direction of the insulating layer.

17. The display device according to claim 13, wherein the display substrate further comprises: a plurality of transistors in the display area and between the first inorganic insulating layer and the base substrate;
the first jumper terminals are arranged in a same layer as sources and drains of the transistors, and the second jumper terminals are arranged in a same layer as gates of the transistors.

* * * * *